(No Model.)
J. C. BOEHM.
FOUR HORSE EVENER.
No. 411,707. Patented Sept. 24, 1889.
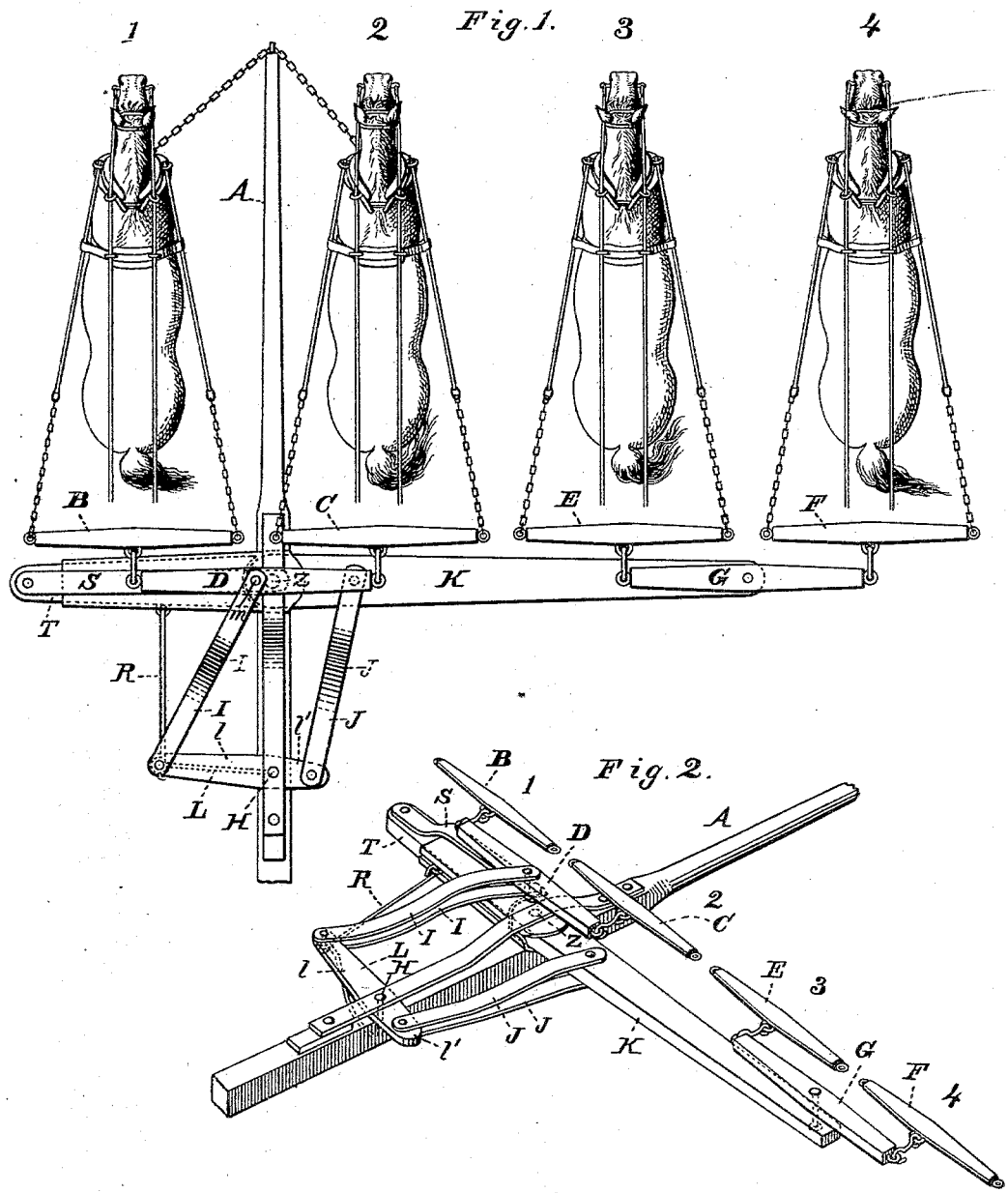
WITNESSES
Villette Anderson,
Mary Tompkins.
INVENTOR
John C. Boehm
by E. W. Anderson.
Attorney

UNITED STATES PATENT OFFICE.

JOHN C. BOEHM, OF RICH PRAIRIE, MINNESOTA.

FOUR-HORSE EVENER.

SPECIFICATION forming part of Letters Patent No. 411,707, dated September 24, 1889.

Application filed May 11, 1889. Serial No. 310,450. (No model.)

*To all whom it may concern:*

Be it known that I, JOHN C. BOEHM, a citizen of the United States, and a resident of Rich Prairie, in the county of Morrison and State of Minnesota, have invented certain new and useful Improvements in Four-Horse Eveners; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a top view. Fig. 2 is a perspective view.

The object of the invention is to provide a leverage device whereby four horses can be made to pull evenly when geared up to an eccentric draft-connection, as is often necessary in operating self-binding harvesters and other agricultural machines.

In the accompanying drawings, the letter A designates the pole or draft connection, on one side of which one horse is to pull, while on the other side are three horses. The position of the first horse is indicated by Fig. 1, while the places of the other horses are indicated by Figs. 2, 3, and 4. The pole horses 1 and 2 are geared to the singletrees B and C, respectively, and said singletrees are connected to the doubletree D. The field horses 3 and 4 are geared up to the singletrees E and F, and these singletrees are connected to the doubletree G.

L is the main iron lever, of short length, which is pivoted to the pole or draft point at H, its long arm $l$ extending toward the side of the single horse. To its short arm $l'$ are connected the iron-straps J, the forward ends of which are pivoted to the long draft-lever K, to the end of which the doubletree G of the outer two horses is connected. The inner end of this lever is pivoted at $z$ to the pole, in line with the draft-connection. The power of the two outer horses 3 and 4 is therefore exerted upon the long lever K, and through this lever and the strap-connection J upon the short arm of the main iron lever L. The power of the other two horses 1 and 2 is advantageously connected to the long arm $l$ of the main iron lever L, in the following manner divided to hold these two horses in proper relation to each other and to the pole on opposite sides of which they work.

From the end of the long arm $l$ extends the strap-connections I forward to the doubletree D, to which they are pivoted at $m$, and said doubletree is also pivoted to the lateral guiding-strap S, the outer end of which is pivoted to the outer end of a thrust-bar T, which is pivoted at its inner end to the pole at $z$, or at the pivotal point of the long draft-lever K. A tie-rod R, parallel to the pole, connects the outer end of the long arm $l$ of the main iron lever to the thrust-bar T, and the movement of said thrust-bar is therefore governed by that of said main lever.

By means of the thrust-bar, tie-rod, and lateral strap-connection S the doubletree D is kept in proper relation to the pole, so that the horses geared thereto will not work against the pole, but will move evenly on either side thereof, whether advancing or receding from the normal position.

The strap-connections I and J extend obliquely outward and forward from the main iron lever L to their front pivotal connections, so that the tendency of the machine being on the side of the single horse to pull the pole over to that side is designed to be counteracted.

Having described this invention, what I claim, and desire to secure by Letters Patent, is—

1. A four-horse evener comprising a short main lever having its short arm connected to a long draft-lever carrying the doubletree of the field horses, and its long arm connected to the doubletree of the pole horses and to a thrust-bar, which is also connected to the latter doubletree, substantially as specified.

2. The combination, with the main iron lever L, having arms of unequal length, of the long draft-lever K, carrying the doubletree of the field horses, the oblique strap-connections I and J, the doubletree of the pole horses, the thrust-bar, the lateral guiding-strap, and the tie-rod connecting the long arm of said main lever to said thrust-bar, substantially as specified.

In testimony whereof I affix my signature in presence of two witnesses.

JOHN C. BOEHM.

Witnesses:
   FREDERICK TIEDT, Sr.,
   CHARLES D. WHITE.